(12) United States Patent
Nishimura

(10) Patent No.: US 10,106,674 B2
(45) Date of Patent: Oct. 23, 2018

(54) RUBBER COMPOSITION MANUFACTURING METHOD AND TIRE MANUFACTURING METHOD

(71) Applicant: TOYO TIRE & RUBBER CO., LTD., Osaka-shi, Osaka (JP)

(72) Inventor: Chiya Nishimura, Osaka (JP)

(73) Assignee: TOYO TIRE & RUBBER CO., LTD., Itami-shi (JP)

( * ) Notice: Subject to any disclaimer, the term of this patent is extended or adjusted under 35 U.S.C. 154(b) by 31 days.

(21) Appl. No.: 15/218,532

(22) Filed: Jul. 25, 2016

(65) Prior Publication Data

US 2017/0058110 A1 Mar. 2, 2017

(30) Foreign Application Priority Data

Aug. 27, 2015 (JP) .................................. 2015-167840

(51) Int. Cl.
| | |
|---|---|
| *C08L 9/00* | (2006.01) |
| *C08K 3/04* | (2006.01) |
| *C08L 7/00* | (2006.01) |
| *C08L 7/02* | (2006.01) |
| *C08L 9/06* | (2006.01) |

(52) U.S. Cl.
CPC ..................................... *C08L 9/00* (2013.01); *C08K 3/04* (2013.01); *C08L 7/00* (2013.01); *C08L 7/02* (2013.01); *C08L 9/06* (2013.01); *C08L 2666/55* (2013.01)

(58) Field of Classification Search
CPC ...... C08L 7/00; C08L 7/02; C08L 9/06; C08L 2666/55; C08K 3/04
See application file for complete search history.

(56) References Cited

U.S. PATENT DOCUMENTS

| | | | |
|---|---|---|---|
| 5,798,405 A * | 8/1998 | Zimmer | C08K 3/04 524/492 |
| 5,962,575 A | 10/1999 | Yatsuyanagi et al. | |
| 9,611,380 B2 * | 4/2017 | Thomasson | C08J 3/226 |
| 2012/0053262 A1* | 3/2012 | Chen | C08J 3/22 523/150 |
| 2013/0281570 A1 | 10/2013 | Miyasaka | |
| 2013/0317137 A1 | 11/2013 | Thomasson et al. | |

FOREIGN PATENT DOCUMENTS

| | | |
|---|---|---|
| JP | 10-226736 A | 8/1998 |
| JP | 2001-518401 A | 10/2001 |
| JP | 2005-220187 A | 8/2005 |
| JP | 2007-197622 A | 8/2007 |
| JP | 2008-231152 A | 10/2008 |
| JP | 2012-197375 A | 10/2012 |
| JP | 2014-501288 A | 1/2014 |
| WO | 99/16600 A1 | 4/1999 |
| WO | WO 2012080109 A1 * | 6/2012 ............. C08J 3/226 |

* cited by examiner

*Primary Examiner* — Satya B Sastri
(74) *Attorney, Agent, or Firm* — Westerman, Hattori, Daniels & Adrian, LLP

(57) ABSTRACT

[PROBLEM] To provide a method for manufacturing a rubber composition that will serve as raw material for vulcanized rubber which excels in tear resistance, wet performance, and ability to achieve reduced heat generation.
[SOLUTION MEANS] Manufacture of a tire or of a rubber composition by means of a method comprising an operation in which (a) a wet master batch comprising a first rubber and a first carbon black, (b) a second rubber comprising styrene-butadiene rubber, and (c) a second carbon black are dry-blended together under specific conditions.

13 Claims, No Drawings

RUBBER COMPOSITION MANUFACTURING METHOD AND TIRE MANUFACTURING METHOD

TECHNICAL FIELD

The present invention relates to a rubber composition manufacturing method and a tire manufacturing method.

BACKGROUND ART

It is possible through use of a wet master batch to make a rubber composition that will serve as raw material for vulcanized rubber which excels in workability, reinforcement characteristics, and so forth (see, for example, Patent Reference Nos. 1 through 7).

PRIOR ART REFERENCES

Patent References

PATENT REFERENCE NO. 1: Japanese Patent Application Publication Kokai No. 2005-220187
PATENT REFERENCE NO. 2: Japanese Patent Application Publication Kokai No. 2012-197375
PATENT REFERENCE NO. 3: Japanese Patent Application Publication Kokai No. 2007-197622
PATENT REFERENCE NO. 4: Japanese Patent Application Publication Kokai No. H10[1998]-226736
PATENT REFERENCE NO. 5: International Patent Application Japanese Translation Publication No. 2001-518401
PATENT REFERENCE NO. 6: Japanese Patent Application Publication Kokai No. 2008-231152
PATENT REFERENCE NO. 7: International Patent Application Japanese Translation Publication No. 2014-501288

SUMMARY OF INVENTION

Problem to be Solved by Invention

There is demand for well-balanced improvement in the tear resistance, wet performance, and ability to achieve reduced heat generation of vulcanized rubber. However, simultaneous improvement of these capabilities is not easy. For example, increase in the blended amount of carbon black will permit improvement in wet performance but will have deleterious effect on tear resistance and ability to achieve reduced heat generation. Decrease in the blended amount of vulcanizing-type compounding ingredient(s) will permit improvement in tear resistance and wet performance but will have deleterious effect on ability to achieve reduced heat generation.

Patent Reference No. 1 describes art for dry kneading of natural rubber master batch and styrene-butadiene rubber and carbon black. However, Patent Reference No. 1 does not disclose the idea of decreasing the fractional amount of carbon black in the styrene-butadiene rubber phase and increasing the fractional amount of carbon black in the natural rubber phase to improve tear resistance, wet performance, and ability to achieve reduced heat generation. Nor is this idea disclosed by Patent Reference Nos. 2 through 7.

The present invention was conceived in light of such situation, it being an object thereof to provide a method for manufacturing a rubber composition that will serve as raw material for vulcanized rubber which excels in tear resistance, wet performance, and ability to achieve reduced heat generation.

Means for Solving Problem

The present inventor(s) came to the realization that there was a bias toward presence of carbon black at the styrene-butadiene rubber phase. In addition, the present inventor(s) perfected the present invention upon discovering that improvement of tear resistance, wet performance, and reduced heat generation could be achieved by decreasing the fractional amount of carbon black in the styrene-butadiene rubber phase and increasing the fractional amount of carbon black in the natural rubber phase.

To solve the foregoing problems, the present invention is provided with a constitution as described below. That is, the present invention relates to a method for manufacturing a rubber composition comprising an operation in which (a) a wet master batch comprising a first rubber and a first carbon black, (b) a second rubber comprising styrene-butadiene rubber, and (c) a second carbon black are dry-blended together under conditions satisfying both Formula I, below, and Formula II, below. The first rubber comprises natural rubber and/or polyisoprene rubber. At the operation in which the wet master batch, the second rubber, and the second carbon black are dry-blended together, the styrene-butadiene rubber is present in an amount that is not less than 10 parts by mass for every 100 parts by mass of the first rubber and the second rubber combined. At the operation in which the wet master batch, the second rubber, and the second carbon black are dry-blended together, the first rubber is present in an amount that is not less than 20 parts by mass for every 100 parts by mass of the first rubber and the second rubber combined.

$$0.40 \le A/C \le 1.20 \qquad \text{FORMULA I}$$

At Formula I, A indicates amount of first carbon black for every 100 parts by mass of first rubber; C indicates combined amount of first carbon black and second carbon black for every 100 parts by mass of first rubber and second rubber combined.

$$0.80 \le (B/D) \times 100/C \le 1.30 \qquad \text{FORMULA II}$$

At Formula II, B indicates amount of second carbon black for every 100 parts by mass of first rubber and second rubber combined; D indicates amount of second rubber for every 100 parts by mass of first rubber and second rubber combined.

Carrying out dry-blending under conditions such that both Formula I and Formula II are satisfied makes it possible to manufacture a rubber composition that will serve as raw material for vulcanized rubber which excels in tear resistance, wet performance, and ability to achieve reduced heat generation. That is, carrying out dry-blending under conditions such that both Formula I and Formula II are satisfied makes it possible to decrease the fractional amount of carbon black in the styrene-butadiene rubber phase and permits improvement in wet performance and ability to achieve reduced heat generation. Carrying out dry-blending under conditions such that both Formula I and Formula II are satisfied makes it possible to increase the fractional amount of carbon black in the natural rubber phase and permits improvement in tear resistance and ability to achieve reduced heat generation. Employment of a wet master batch makes it possible to improve dispersion characteristics of carbon black and permits improvement in tear resistance and ability to achieve reduced heat generation. Conversely, if the amount of styrene-butadiene rubber is less than 10 parts by mass for every 100 parts by mass of the first rubber and the second rubber combined, improvement of wet performance may not be possible. If the amount of the first rubber is less than 20 parts by mass for every 100 parts by mass of the first rubber and the second rubber combined, improvement of tear resistance and ability to achieve reduced heat generation may not be possible.

The present invention also relates to a tire manufacturing method comprising a rubber composition manufacturing method. Carrying out dry-blending under conditions such that both Formula I and Formula II are satisfied makes it possible to manufacture a rubber composition that will serve as raw material for a tire which excels in tear resistance, wet performance, and ability to achieve reduced heat generation.

EMBODIMENTS FOR CARRYING OUT INVENTION

A method for manufacturing a rubber composition associated with an embodiment of the present invention comprises an operation in which a wet master batch is made. The wet master batch comprises a first rubber and a first carbon black. The method for manufacturing a rubber composition associated with the embodiment of the present invention further comprises an operation in which the wet master batch, a second rubber, and a second carbon black are dry-blended together.

Operation in which Wet Master Batch is Made

The operation in which the wet master batch is made comprises a step (I) in which a shiny is made. The operation in which the wet master batch is made further comprises a step (II) in which the slurry and a rubber latex solution are blended together.

The step (I) in which the shiny is made comprises a stage in which the first carbon black and a dispersion solvent are blended.

As examples of the first carbon black, besides SAF, ISAF, HAF, FEF, GPF, and other such carbon blacks ordinarily used in the rubber industry, acetylene black, Ketchen black, and/or other such electrically conductive carbon blacks may be used. The first carbon black may be nonganulated carbon black or may be granulated carbon black that has been granulated based upon considerations related to the handling characteristics thereof as is ordinary practice in the rubber industry.

As the dispersion solvent, while water is particularly preferred, water which contains organic solvent may also be used.

The slurry comprises the first carbon black. The slimy further comprises the dispersion solvent.

As the rubber latex solution, natural, rubber latex solution and polyisoprene rubber latex solution may be cited as examples. As the natural rubber latex solution, it is preferred that the natural rubber be natural product(s) of plant metabolism, and in particular that the dispersion solvent be water, such that that the natural rubber latex solution is a natural rubber/water system. As the natural rubber latex solution, latex concentrate, fresh latex such as that which is referred to as "field latex," or any other such latex may be used without distinction.

As examples of method(s) for the blending at step (I) and step (II), agitation methods involving use of high-shear mixers, high shear mixers, homomixers, ball mills, bead mills, high-pressure homogenizers, ultrasonic homogenizers, colloid mills, and other such ordinary dispersers may be cited.

The operation in which the wet master batch is made further comprises a step (III) in which a coagulant is added to the blended liquid obtained at step (II). As the coagulant, acid may be cited as an example. As the acid, formic acid, sulfuric acid, and the like may be cited as examples. The operation in which the wet master batch is made further comprises a step (IV) in which the coagulum obtained at step (III) is dewatered. As the dewatering method, dewatering methods involving use of single screw extruders, ovens, vacuum dryers, air dryers, and other such drying apparatuses may be cited as examples.

The wet master batch obtained by means of the foregoing operation comprises a first rubber and a first carbon black. The first rubber comprises at least one of natural rubber and polyisoprene rubber. For every 100 parts by mass of the first rubber, it is preferred that the combined amount of the natural rubber and the polyisoprene rubber be not less than 70 parts by mass, more preferred that this be not less than 80 parts by mass, still more preferred that this be not less than 90 parts by mass, and particularly preferred that this be 100 parts by mass. For every 100 parts by mass of the first rubber, it is preferred that the amount of the first carbon black be not less than 10 parts by mass, and more preferred that this be not less than 20 parts by mass. For every 100 parts by mass of the first rubber, it is preferred that the amount of the first carbon black be not more than 80 parts by mass, and more preferred that this be not more than 70 parts by mass.

Dry-Blending Operation

The wet master batch, the second rubber, and the second carbon black are dry-blended together using a mixing machine under conditions satisfying both Formula I, below, and Formula II, below. As the mixing machine, an internal mixer, an open roll mill, or the like may be favorably employed. As the internal mixer, Banbury mixers, kneaders, and the like may be cited as examples.

$$0.40 \leq A/C \leq 1.20 \qquad \text{FORMULA I}$$

At Formula I, A indicates amount (parts by mass) of first carbon black for every 100 parts by mass of first rubber; C indicates combined amount (parts by mass) of first carbon black and second carbon black for every 100 parts by mass of first rubber and second rubber combined.

$$0.80 \leq (B/D) \times 100/C \leq 1.30 \qquad \text{FORMULA II}$$

At Formula II, B indicates amount (parts by mass) of second carbon black for every 100 parts by mass of first rubber and second rubber combined; D indicates amount (parts by mass) of second rubber for every 100 parts by mass of first rubber and second rubber combined.

The second rubber comprises styrene-butadiene rubber. It is preferred that the styrene-butadiene rubber have a glass transition temperature that is −60° C. to 0° C. Causing this to be −60° C. to 0° C. will allow wet performance to be improved by a wide margin. The second rubber may further comprise butadiene rubber. The second rubber may further comprise natural rubber, polyisoprene rubber, chloroprene rubber, nitrile rubber, and/or the like. For every 100 parts by mass of the second rubber, it is preferred that the amount of the styrene-butadiene rubber be not less than 50 parts by mass, more preferred that this be not less than 60 parts by mass, and still more preferred that this be not less than 70 parts by mass.

As examples of the second carbon black, besides SAF, ISAF, HAF, FEF, GPF, and other such carbon blacks ordinarily used in the rubber industry, acetylene black, Ketchen black, and/or other such electrically conductive carbon blacks may be used. The second carbon black may be nongranulated carbon black or may be granulated carbon black that has been granulated based upon considerations related to the handling characteristics thereof as is ordinary practice in the rubber industry.

If A/C is less than 0.40, improvement of tear resistance and ability to achieve reduced heat generation will not be possible. If A/C is greater than 1.20, improvement of tear resistance will not be possible. This is because the degree to which the natural rubber phase is reinforced will be too large relative to the degree to which the stylene-butadiene rubber phase is reinforced. If (B/D)×100/C is less than 0.80, improvement of tear resistance will not be possible. This is because the degree to which the styrene-butadiene rubber phase is reinforced will be too small. If (B/D)×100/C is greater than 1.30, improvement of tear resistance and ability to achieve reduced heat generation will not be possible.

At the dry-blending operation, for every 100 parts by mass of the first rubber and the second rubber combined, the amount of the styrene-butadiene rubber is not less than 10 parts by mass, is preferably not less than 20 parts by mass, and is more preferably not less than 30 parts by mass. If this is less than 10 parts by mass, improvement of wet performance will not be possible. It is preferred that the amount of the styrene-butadiene rubber be not more than 80 parts by mass for every 100 parts by mass of the first rubber and the second rubber combined.

At the dry-blending operation, it is preferred that the amount of the first rubber be not less than 20 parts by mass for every 100 parts by mass of the first rubber and the second rubber combined. If this is less than 20 parts by mass, improvement of tear resistance and ability to achieve reduced heat generation may not be possible. For every 100 parts by mass of the first rubber and the second rubber combined, it is preferred that the amount of the first rubber be not more than 90 parts by mass, more preferred that this be not more than 80 parts by mass, and still more preferred that this be not more than 70 parts by mass.

Oil, stearic acid, zinc oxide, antioxidant, silica, silane coupling agent, and/or the like may be blended together with the wet master batch, the second rubber, and the second carbon black. As examples of the antioxidant, aromatic-amine-type antioxidants, amine-ketone-type antioxidants, monophenol-type antioxidants, bisphenol-type antioxidants, polyphenol-type antioxidants, dithiocarbarnate-type antioxidants, thiourea-type antioxidants, and the like may be cited. At the dry-blending operation, for every 100 parts by mass of the first rubber and the second rubber combined, the amount of the antioxidant is not less than 0.1 part by mass, and is preferably not less than 0.5 part by mass. For every 100 parts by mass of the first rubber and the second rubber combined, it is preferred that the amount of the antioxidant be not more than 10 parts by mass, and more preferred that this be not more than 5 parts by mass.

Final Blending/Kneading Operation

Kneading of the blended material obtained at the dry-blending operation and a vulcanizing-type compounding ingredient is carried out.

As examples of the vulcanizing-type compounding ingredient, sulfur, organic peroxides, and other such vulcanizing agents, vulcanization accelerators, vulcanization accelerator activators, vulcanization retarders, and so forth may be cited. As the sulfur, powdered sulfur, precipitated sulfur, insoluble sulfur, high dispersing sulfur, and the like may be cited as examples. Based upon consideration of post-vulcanization rubber properties, endurance, and so forth, it is preferred that the amount of sulfur compounded therein, expressed as equivalent sulfur content, be 0.5 part by mass to 5.0 parts by mass for every 100 parts by mass of diene rubber. As examples of the vulcanization accelerators, sulfenamide-type vulcanization vulcanization accelerators, thiuram-type vulcanization accelerators, thiazole-type vulcanization accelerators, thiourea-type vulcanization accelerators, guanidine-type vulcanization accelerators, dithiocarbamate-type vulcanization accelerators, and so forth may be cited. It is preferred that the amount of vulcanization accelerator compounded therein be 0.1 part by mass to 5.0 parts by mass for every 100 parts by mass of diene rubber.

Rubber compositions obtained by means of methods in accordance with embodiments of the present invention may be favorably employed as tires, and in particular may be favorably employed as pneumatic tires. A method for manufacturing a tire associated with an embodiment of the present invention comprises an operation in which a peen tire is made. The green tire is provided with a tire member comprising a rubber composition. As the tire member, a tread may be cited as an example. A method for manufacturing a tire associated with an embodiment of the present invention further comprises an operation in which the green tire is heated.

Variation 1

The step (I) in which the slurry is made comprises a stage in which the first carbon black and a dilute rubber latex solution are blended. This will permit formation of an extremely thin latex phase on all or part of the surface of the carbon black, and will make it possible to prevent reflocculation of carbon black. The dilute rubber latex solution may be made by blending the dispersion solvent and a rubber latex solution.

WORKING EXAMPLES

Working examples and the like which illustrate the constitution and effect of the present invention in specific terms are described below. The raw material employed was as follows.

| RAW MATERIAL EMPLOYED | |
|---|---|
| Dispersion solvent | Water |
| Natural rubber latex solution | Solution prepared by adding water at normal temperature (25° C.) to natural rubber latex and adjusting rubber content so as to be 27 mass % |
| Natural rubber concentrated latex solution (dry rubber content (DRC) = 60%; mass-average molecular weight Mw = 236,000) | Manufactured by Regitex Co., Ltd. |
| Natural rubber fresh latex solution (NR Field Latex; DRC = 31.2%; Mw = 232,000) | Manufactured by Golden Hope |
| Coagulant | Formic acid (reagent-grade 85%; diluted, to obtain 10% solution; pH adjusted to 1.2) manufactured by Nacalai Tesque, Inc. |
| NR | RSS3 |
| SBR1 | "SBR1500" manufactured by JSR Corporation (Tg. −66° C.) |
| SBR2 | "SBR0120" manufactured by JSR Corporation (Tg −54° C.; oil content 37.5 phr) |

-continued

| RAW MATERIAL EMPLOYED | |
|---|---|
| SBR3 | "SBR0202" manufactured by JSR Corporation (Tg −28.5° C.) |
| BR | "BR01" manaufactured by JSR Corporation |
| Carbon black | "SEAST 9" manufactured by Tokai Carbon Co., Ltd. |
| Oil | "Process NC140" manufactured by JOMO |
| Stearic acid | "LUNAC S-20" manufactured by Kao Corporation |
| Zinc oxide | "Zinc Oxide No. 1" manufactured by Mitsui Mining |
| Antioxidant A | "NOCRAC 6C" manufactured by Ouchi Shinko Chemical Industrial Co., Ltd. |
| Antioxidant B | "Antage RD" manufactured by Kawaguchi Chemical Industry Co., Ltd, |
| Vulcanization accelerator | "Sanceler NS-G" manufactured by Sanshin Chemical Industry Co., Ltd. |
| Sulfur | "Powdered Sulfur" manufactured by Tsurumi Chemical Industry Co., Ltd. |

Comparative Examples 1-4, Comparative Example 8, and Comparative Examples 11-13

Manufacture of Rubber Composition

The respective compounding ingredients except for sulfur and vulcanization accelerator were blended in amounts as listed at TABLE 1, a Model B Banbury mixer manufactured by Kobe Steel, Ltd., was used to carry out mixing at a rotational speed of 80 RPM, and the nonprocessed rubber mass was discharged at 140° C. The nonprocessed rubber mass was mixed together with sulfur and vulcanization accelerator in a two-roll mill to manufacture a rubber composition.

Comparative Example 5

Manufacture of Dry Master Batch

A Model B Banbury mixer manufactured by Kobe Steel, Ltd., was used to carry out mixing of NR and carbon black in amounts as listed at TABLE 1 to manufacture a dry master batch.

Manufacture of Rubber Composition

The respective compounding ingredients except for sulfur and vulcanization accelerator were blended in amounts as listed at TABLE 1, a Model B Banbury mixer manufactured by Kobe Steel, Ltd., was used to carry out mixing at a rotational speed of 80 RPM, and the nonprocessed rubber mass was discharged at 140° C. The nonprocessed rubber mass was mixed together with sulfur and vulcanization accelerator in a two-roll mill to manufacture a rubber composition.

Comparative Examples 6-7, Comparative Examples 9-10, and Working Examples 1-7

Manufacture of Wet Master Batch

Carbon black in amounts as listed at TABLES 1 through 5 was added to water, and a ROBO MIX manufactured by PRIMIX Corporation was used to disperse the carbon black (ROBO MIX conditions: 9000 rpm; 30 min) to manufacture a "carbon-black-containing slurry solution". Natural rubber latex solution was added to the "carbon-black-containing slurry solution" in such amount as to cause solids content (rubber) to be 100 parts by mass. A mixer for household use manufactured by SANYO was used to carry out agitation (mixer conditions: 11300 rpm; 30 min) to manufacture a "carbon-black-containing natural rubber latex solution". The "carbon-black-containing natural rubber latex solution" was maintained at 90° C. while a 10 mass % aqueous solution of formic acid was added thereto in an amount sufficient to achieve a pH of 4 to obtain a coagulum. A Model V-02 screw press (squeezer-type single-screw dewatering extruder) manufactured by Suehiro EPI Corporation was used to dry the coagulum until water content was not more than 1.5% to manufacture a wet master batch.

Manufacture of Rubber Composition

The respective compounding ingredients except for sulfur and vulcanization accelerator were blended in amounts as listed at TABLE 1, a Model B Banbury mixer manufactured by Kobe Steel, Ltd., was used to carry out mixing at a rotational speed of 80 RPM, and the nonprocessed rubber mass was discharged at 140° C. The nonprocessed rubber mass was mixed together with sulfur and vulcanization accelerator in a two-roll mill to manufacture a rubber composition.

Evaluation

The rubber composition was vulcanized at conditions of 150° C. for 30 min to obtain vulcanized rubber. Heat generation, tear resistance, and wet performance of the vulcanized rubber were evaluated. Conditions under which evaluation was performed are as indicated below. Results are shown in TABLE 1.

Heat Generation

A viscoelasticity testing machine manufactured by Toyo Seiki was used to measure the loss factor tan δ at frequency 10 Hz, 10% static strain, 1% dynamic strain, and 60° C. temperature. Results at TABLE 1 are indexed relative to the value obtained at Comparative Example 1, which was taken to be 100. Results at TABLE 2 are indexed relative to the value obtained at Comparative Example 8, which was taken to be 100. Results at TABLE 3 are indexed relative to the value obtained at Comparative Example 11, which was taken to be 100. Results at TABLE 4 are indexed relative to the value obtained at Comparative Example 12, which was taken to be 100. Results at TABLE 5 are indexed relative to the value obtained at Comparative Example 13, which was taken to be 100. The smaller the value the greater the ability to achieve reduced heat generation, i.e., the greater the improvement.

Tear Resistance

Punching of crescent-shaped pieces was carried out in accordance with the JIS K 6252 standard. Samples were prepared by placing a cut which was 0.50 mm±0.08 mm at the center of the concavity. A tensile test machine from Shimadzu Corporation was used to carry out testing of samples at a grip separation rate of 500 mm/min. Results at TABLE 1 are indexed relative to the value obtained at Comparative Example 1, which was taken to be 100. Results at TABLE 2 are indexed relative to the value obtained at Comparative Example 8, which was taken to be 100. Results at TABLE 3 are indexed relative to the value, obtained at Comparative Example 11, which was taken to be 100. Results at TABLE 4 are indexed relative to the value obtained at Comparative Example 12, which was taken to be 100. Results at TABLE 5 are indexed relative to the value obtained at Comparative Example 13, which was taken to be 100. The larger the value the better the resistance to tearing, i.e., the greater the improvement.

Wet Performance

A viscoelasticity testing machine manufactured by Toyo Seiki was used to measure the loss factor tan δ at frequency 10 Hz, 10% static strain, 1% dynamic strain, and 0° C. temperature. Results at TABLE 1 are indexed relative to the value obtained at Comparative Example 1, which was taken to be 100. Results at TABLE 2 are indexed relative to the value obtained at Comparative Example 8, which was taken to be 100. Results at TABLE 3 are indexed relative to the value obtained at Comparative Example 11, which was taken to be 100. Results at TABLE 4 are indexed relative to the value obtained at Comparative Example 12, which was taken to be 100. Results at TABLE. 5 are indexed relative to the value obtained at Comparative Example 13, which was taken to be 100. The larger the value the better the wet performance, i.e., the greater the improvement.

TABLE 1

|  |  | Comparative Example 1 | Comparative Example 2 | Comparative Example 3 | Comparative Example 4 | Comparative Example 5 | Comparative Example 6 | Comparative Example 7 | Working Example 1 | Working Example 2 | Working Example 3 |
|---|---|---|---|---|---|---|---|---|---|---|---|
| Master Batch | | | | | | | | | | | |
| Amount (parts by mass) | NR | — | — | — | — | 100 | 100 | 100 | 100 | 100 | 100 |
| | Carbon black | — | — | — | — | 30 | 10 | 90 | 30 | 40 | 60 |
| Manufacturing method | | — | — | — | — | Dry | Wet | Wet | Wet | Wet | Wet |
| Rubber composition | | | | | | | | | | | |
| Amount (parts by mass) | NR | 20 | 20 | 20 | 20 | — | — | — | — | — | — |
| | Dry master batch | — | — | — | — | 26 | — | — | — | — | — |
| | Wet master batch | — | — | — | — | — | 22 | 38 | 26 | 28 | 32 |
| | SBR1 | 80 | 80 | 80 | 80 | 80 | 80 | 80 | 80 | 80 | 80 |
| | SBR2 | — | — | — | — | — | — | — | — | — | — |
| | SBR3 | — | — | — | — | — | — | — | — | — | — |
| | BR | — | — | — | — | — | — | — | — | — | — |
| | Carbon black | 70 | 60 | 80 | 70 | 64 | 68 | 52 | 64 | 62 | 58 |
| | Oil | 20 | 20 | 20 | 20 | 20 | 20 | 20 | 20 | 20 | 20 |
| | Stearic acid | 3 | 3 | 3 | 3 | 3 | 3 | 3 | 3 | 3 | 3 |
| | Zinc oxide | 2 | 2 | 2 | 2 | 2 | 2 | 2 | 2 | 2 | 2 |
| | Antioxidant A | 1 | 1 | 1 | 1 | 1 | 1 | 1 | 1 | 1 | 1 |
| | Antioxidant B | 0.5 | 0.5 | 0.5 | 0.5 | 0.5 | 0.5 | 0.5 | 0.5 | 0.5 | 5.5 |
| | Vulcanization accelerator | 2 | 2 | 2 | 1.7 | 2 | 2 | 2 | 2 | 2 | 2 |
| | Sulfur | 2 | 2 | 2 | 1.7 | 2 | 2 | 2 | 2 | 2 | 2 |
| Total amount of carbon black | | 70 | 60 | 80 | 70 | 70 | 70 | 70 | 70 | 70 | 70 |
| Conditions | | | | | | | | | | | |
| $0.40 \leq A/C \leq 1.20$ | | — | — | — | — | — | 0.14 | 1.29 | 8.43 | 9.57 | 0.86 |
| $0.80 \leq (B/D) * 100/C \leq 1.30$ | | — | — | — | — | 1.14 | 1.21 | 0.93 | 1.14 | 1.11 | 1.04 |
| $10 \leq$ SBR content | | ○ | ○ | ○ | ○ | ○ | ○ | ○ | ○ | ○ | ○ |
| $20 \leq$ NR (WMB) | | X | X | X | X | X | ○ | ○ | ○ | ○ | ○ |
| Properties | | | | | | | | | | | |
| Heat generation | | 100 | 90 | 105 | 104 | 98 | 101 | 80 | 54 | 91 | 86 |
| Tear resistance | | 100 | 104 | 85 | 104 | 90 | 97 | 81 | 105 | 109 | 112 |
| Wet performance | | 100 | 90 | 106 | 103 | 103 | 102 | 115 | 106 | 109 | 113 |

TABLE 2

|  |  | Comparative Example 8 | Comparative Example 9 | Comparative Example 10 | Working Example 4 |
|---|---|---|---|---|---|
| Master Batch | | | | | |
| Amount (parts by mass) | NR | — | 100 | 100 | 100 |
| | Carbon black | — | 30 | 80 | 60 |
| Manufacturing method | | — | Wet | Wet | Wet |
| Rubber composition | | | | | |
| Amount (parts by mass) | NR | 60 | — | — | — |
| | Dry master batch | — | — | — | — |
| | Wet master batch | — | 78 | 108 | 96 |
| | SBR1 | 40 | 40 | 40 | 40 |
| | SBR2 | — | — | — | — |
| | SBR3 | — | — | — | — |
| | BR | — | — | — | — |
| | Carbon black | 70 | 52 | 22 | 34 |
| | Oil | 20 | 20 | 20 | 20 |
| | Stearic acid | 3 | 3 | 3 | 3 |
| | Zinc oxide | 2 | 2 | 2 | 2 |
| | Antioxidant A | 1 | 1 | 1 | 1 |

TABLE 2-continued

|  | Comparative Example 8 | Comparative Example 9 | Comparative Example 10 | Working Example 4 |
|---|---|---|---|---|
| Antioxidant B | 0.5 | 0.5 | 0.5 | 0.5 |
| Vulcanization accelerator | 2 | 2 | 2 | 2 |
| Sulfur | 2 | 2 | 2 | 2 |
| Total amount of carbon black | 70 | 70 | 70 | 70 |
| Conditions |  |  |  |  |
| 0.40 ≤ A/C ≤ 1.20 | — | 0.43 | 1.14 | 0.86 |
| 0.80 ≤ (B/D) * 100/C ≤ 1.30 | — | 1.86 | 0.79 | 1.21 |
| 10 ≤ SBR content | ○ | ○ | ○ | ○ |
| 20 ≤ NR (WMB) | X | ○ | ○ | ○ |
| Properties |  |  |  |  |
| Heat generation | 100 | 105 | 98 | 93 |
| Tear resistance | 100 | 95 | 86 | 108 |
| Wet performance | 100 | 104 | 108 | 106 |

TABLE 3

|  |  | Comparative Example 11 | Working Example 5 |
|---|---|---|---|
| Master Batch |  |  |  |
| Amount (parts by mass) | NR | — | 100 |
|  | Carbon black | — | 40 |
| Manufacturing method |  | — | Wet |
| Rubber composition |  |  |  |
| Amount (parts by mass) | NR | 20 | — |
|  | Dry master batch | — | — |
|  | Wet master batch | — | 28 |
|  | SBR1 | 60 | 60 |
|  | SBR2 | — | — |
|  | SBR3 | — | — |
|  | BR | 20 | 20 |
|  | Carbon black | 70 | 62 |
|  | Oil | 20 | 20 |
|  | Stearic acid | 3 | 3 |
|  | Zinc oxide | 2 | 2 |
|  | Antioxidant A | 1 | 1 |
|  | Antioxidant B | 0.5 | 0.5 |
|  | Vulcanization accelerator | 2 | 2 |
|  | Sulfur | 2 | 2 |
| Total amount of carbon black |  | 70 | 70 |
| Conditions |  |  |  |
| 0.40 ≤ A/C ≤ 1.20 | — | 0.57 |
| 0.80 ≤ (B/D) * 100/C ≤ 1.30 | — | 1.11 |
| 10 ≤ SBR content | ○ | ○ |
| 20 ≤ NR (WMB) | X | ○ |
| Properties |  |  |  |
| Heat generation |  | 100 | 89 |
| Tear resistance |  | 100 | 107 |
| Wet performance |  | 100 | 106 |

TABLE 4

|  |  | Comparative Example 12 | Working Example 6 |
|---|---|---|---|
| Master Batch |  |  |  |
| Amount (parts by mass) | NR | — | 100 |
|  | Carbon black | — | 40 |
| Manufacturing method |  | — | Wet |
| Rubber composition |  |  |  |
| Amount (parts by mass) | NR | 20 | — |
|  | Dry master batch | — | — |
|  | Wet master batch | — | 28 |
|  | SBR1 | — | — |
|  | SBR2 | 110 | 110 |
|  | SBR3 | — | — |
|  | BR | — | — |
|  | Carbon black | 70 | 62 |
|  | Oil | 2 | 2 |
|  | Stearic acid | 3 | 3 |
|  | Zinc oxide | 2 | 2 |
|  | Antioxidant A | 1 | 1 |
|  | Antioxidant B | 0.5 | 0.5 |
|  | Vulcanization accelerator | 2 | 2 |
|  | Sulfur | 2 | 2 |
| Total amount of carbon black |  | 70 | 70 |
| Conditions |  |  |  |
| 0.40 ≤ A/C ≤ 1.20 | — | 0.57 |
| 0.80 ≤ (B/D) * 100/C ≤ 1.30 | — | 1.11 |
| 10 ≤ SBR content | ○ | ○ |
| 20 ≤ NR (WMB) | X | ○ |
| Properties |  |  |  |
| Heat generation | 100 | 92 |
| Tear resistance | 100 | 107 |
| Wet performance | 100 | 112 |

TABLE 5

|  |  | Comparative Example 13 | Working Example 7 |
|---|---|---|---|
| Master Batch |  |  |  |
| Amount (parts by mass) | NR | — | 100 |
|  | Carbon black | — | 40 |
| Manufacturing method |  | — | Wet |
| Rubber composition |  |  |  |
| Amount (parts by mass) | NR | 20 | — |
|  | Dry master batch | — | — |
|  | Wet master batch | — | 28 |
|  | SBR1 | — | — |
|  | SBR2 | — | — |
|  | SBR3 | 80 | 80 |

TABLE 5-continued

| | Comparative Example 13 | Working Example 7 |
|---|---|---|
| BR | — | — |
| Carbon black | 70 | 62 |
| Oil | 15 | 15 |
| Stearic acid | 3 | 3 |
| Zinc oxide | 2 | 2 |
| Antioxidant A | 1 | 1 |
| Antioxidant B | 0.5 | 0.5 |
| Vulcanization accelerator | 2 | 2 |
| Sulfur | 2 | 2 |
| Total amount of carbon black | 70 | 70 |
| Conditions | | |
| 0.40 ≤ A/C ≤ 1.20 | — | 0.57 |
| 0.80 ≤ (B/D) * 100/C ≤ 1.30 | — | 1.11 |
| 10 ≤ SBR content | ○ | ○ |
| 20 ≤ NR (WMB) | X | ○ |
| Properties | | |
| Heat generation | 100 | 95 |
| Tear resistance | 100 | 106 |
| Wet performance | 100 | 116 |

At Comparative Example 2, where the amount of carbon black was lower than at Comparative Example 1, tear resistance and ability to achieve reduced heat generation were better, but wet performance was worse, than at Comparative Example 1. At Comparative Example 3, where the amount of carbon black was higher than at Comparative Example 1, wet performance was better, but tear resistance and ability to achieve reduced heat generation were worse, than at Comparative Example 1. At Comparative Example 4, where the amount of vulcanizing-type compounding ingredient was lower than at Comparative Example 1, wet performance and tear resistance were better, but ability to achieve reduced heat generation was worse, than at Comparative Example 1.

At Working Examples 1 through 3, where kneading with a Model. B Banbury mixer was carried out under conditions satisfying both Formula I and Formula II so as to decrease the fractional amount of carbon black in the styrene-butadiene rubber phase and increase the fractional amount of carbon black in the natural rubber phase, tear resistance, wet performance, and ability to achieve reduced heat generation were better than at Comparative Example 1. It is thought that decrease in the fractional amount of carbon black in the styrene-butadiene rubber phase caused improvement in wet performance and improvement in ability to achieve reduced heat generation. It is thought that increase in the fractional amount of carbon black in the natural rubber phase caused improvement in tear resistance and improvement in ability to achieve reduced heat generation. In contrast, at Comparative Example 6, where A/C was 0.14, wet performance, tear resistance, and ability to achieve reduced heat generation were about the same as at Comparative Example 1. The lack of improvement in properties is thought to be due to the fact that the amount of carbon black originating from the wet master hatch was low. At Comparative Example 7, where A/C was 1.29, tear resistance was worse than at Comparative Example 1. It is thought that the fractional amount of carbon black in the natural rubber phase was too large relative to the fractional amount of carbon black in the styrene-butadiene rubber phase.

At Comparative Example 5, which employed a dry master batch, tear resistance was worse than at Comparative Example 1. It is thought that the fact that dispersion characteristics for carbon black are worse with a dry master batch than with a wet master batch prevented increase in the fractional amount of carbon black in the natural rubber phase at Comparative Example 5. This is therefore thought to have caused tear resistance to be poor. The fact that a Banbury mixer was employed to carry out kneading for manufacture of the dry master hatch is also thought to be a reason that the tear resistance of Comparative Example 5 was poor.

At Working Example 4, where both Formula I and Formula II were satisfied, tear resistance, wet performance, and ability to achieve reduced heat generation were better than at Comparative Example 8. In contrast, at Comparative Example 9, where (B/D)×100/C was 1.86, tear resistance and ability to achieve reduced heat generation were worse than at Comparative Example 8. It is thought that the fractional amount of carbon black in the styrene-butadiene rubber phase was too large. At Comparative Example 10, where (B/D)×100/C was 0.79, tear resistance was worse than at Comparative Example 8. It is thought that the fractional amount of carbon black in the styrene-butadiene rubber phase was too small.

At Working Example 5, where both Formula I and Formula II were satisfied, tear resistance, wet performance, and ability to achieve reduced heat generation were better than at Comparative Example 11.

At Working Example 6, where both Formula I and Formula II were satisfied, tear resistance, wet performance, and ability to achieve reduced heat generation were better than at Comparative Example 12. The margin by which wet performance was improved at Working Example 6, i.e., +12, was greater than the margin by which wet performance was improved at Working Example 2, i.e., +9.

At Working Example 7, where both Formula I and Formula II were satisfied, tear resistance, wet performance, and ability to achieve reduced heat generation were better than at Comparative Example 13. The margin by which wet performance was improved at Working Example 7, i.e., +16, was greater than the margin by which wet performance was improved at Working Example 2, i.e., +9.

The invention claimed is:

1. A method for manufacturing a rubber composition comprising:
    forming a wet master batch, wherein the wet master batch comprises a first carbon black and a first rubber comprising natural rubber, polyisoprene rubber, or both; and then
    kneading the wet master batch, a second rubber and a second carbon black
    wherein the second rubber comprises styrene-butadiene rubber, wherein the kneading is performed under conditions satisfying both Formula I and Formula II;
    wherein Formula I is 0.40≤A/C≤1.20;
    wherein A is an amount of the first carbon black for every 100 parts by mass of the first rubber, and C is an amount of the first carbon black and the second carbon black combined for every 100 parts by mass of the first rubber and the second rubber combined;
    wherein Formula II is 0.80≤(B/D)×100/C≤1.30;
    wherein B is an amount of the second carbon black for every 100 parts by mass of the first rubber and the second rubber combined, and D is an amount of the second rubber for every 100 parts by mass of the first rubber and the second rubber combined;
    wherein, in the kneading, the styrene-butadiene rubber is present in an amount that is not less than 10 parts by mass for every 100 parts by mass of the first rubber and the second rubber combined;

wherein, in the kneading, the first rubber is present in an amount that is not less than 20 parts by mass for every 100 parts by mass of the first rubber and the second rubber combined.

2. The method for manufacturing a rubber composition according to claim 1, wherein the styrene-butadiene rubber has a glass transition temperature that is −60° C. to 0° C.

3. A rubber composition obtained by the method for manufacturing the rubber composition according to claim 1.

4. A tire comprising the rubber composition according to claim 3.

5. The method for manufacturing a rubber composition according to claim 1, wherein the second carbon black is selected from a group consisting of SAF, ISAF, HAF, FEF, GPF, acetylene black and Ketchen black.

6. The method for manufacturing a rubber composition according to claim 1, wherein the first carbon black is selected from a group consisting of SAF, ISAF, HAF, FEF, GPF, acetylene black and Ketchen black.

7. A method for manufacturing a tire comprising:

forming a wet master batch, wherein the wet master batch comprises a first carbon black and a first rubber comprising natural rubber, polyisoprene rubber, or both;

kneading the wet master batch, a second rubber and a second carbon black wherein the second rubber comprises styrene-butadiene rubber to manufacture a rubber composition; and making a green tire comprising the rubber composition;

wherein the kneading is performed under conditions satisfying both Formula I and Formula II;

wherein Formula I is $0.40 \leq A/C \leq 1.20$;

wherein A is an amount of the first carbon black for every 100 parts by mass of the first rubber, and C is an amount of the first carbon black and the second carbon black combined for every 100 parts by mass of the first rubber and the second rubber combined;

wherein Formula II is $0.80 \leq (B/D) \times 100/C \leq 1.30$;

wherein B is an amount of the second carbon black for every 100 parts by mass of the first rubber and the second rubber combined, and D is an amount of the second rubber for every 100 parts by mass of the first rubber and the second rubber combined;

wherein, in the kneading, the styrene-butadiene rubber is present in an amount that is not less than 10 parts by mass for every 100 parts by mass of the first rubber and the second rubber combined;

wherein, in the kneading, the first rubber is present in an amount that is not less than 20 parts by mass for every 100 parts by mass of the first rubber and the second rubber combined.

8. The method for manufacturing a rubber composition according to claim 1, wherein the first rubber comprises natural rubber and polyisoprene.

9. The method for manufacturing a rubber composition according to claim 1, wherein, in the kneading, the first carbon black is present in an amount that is not less than 10 parts by mass and not more than 80 parts by mass for every 100 parts by mass of the first rubber.

10. The method for manufacturing a rubber composition according to claim 1, wherein, in the kneading, the styrene-butadiene is present in an amount that is not less than 60 parts by mass for every 100 parts by mass of the second rubber.

11. The method for manufacturing a rubber composition according to claim 1, wherein, in the kneading, the styrene-butadiene rubber is present in an amount that is not less than 30 parts by mass for every 100 parts by mass of the first rubber and the second rubber combined.

12. The method for manufacturing a rubber composition according to claim 1, wherein, in the kneading, the styrene-butadiene rubber is present in an amount that is not more than 80 parts by mass for every 100 parts by mass of the first rubber and the second rubber combined.

13. The method for manufacturing a rubber composition according to claim 1, wherein the kneading further comprises an additive selected from the group consisting of oil, stearic acid, zinc oxide, antioxidant, silica and silane coupling agent.

* * * * *